Oct. 25, 1927.
F. A. BUESCHER
1,647,079
SLIDE TROMBONE
Filed Oct. 27, 1926
2 Sheets-Sheet 2
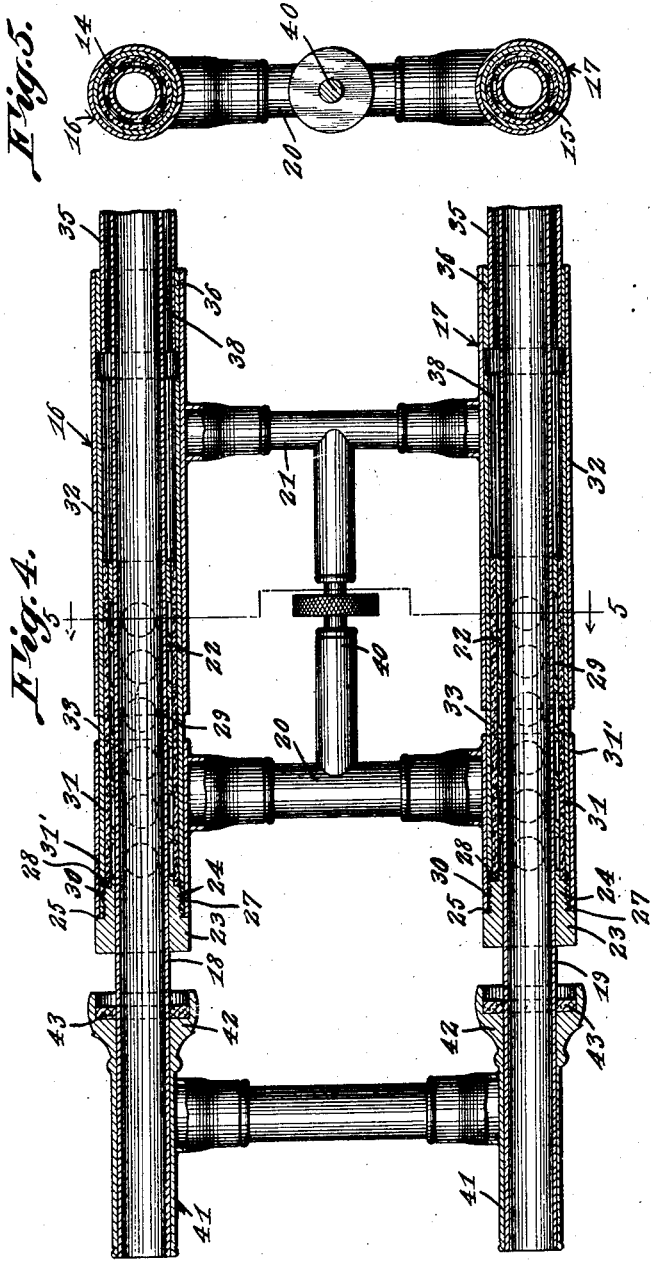
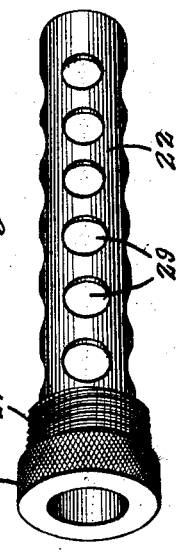
INVENTOR.
Ferdinand A. Buescher,
BY
Geo. F. Kimmel
ATTORNEY.

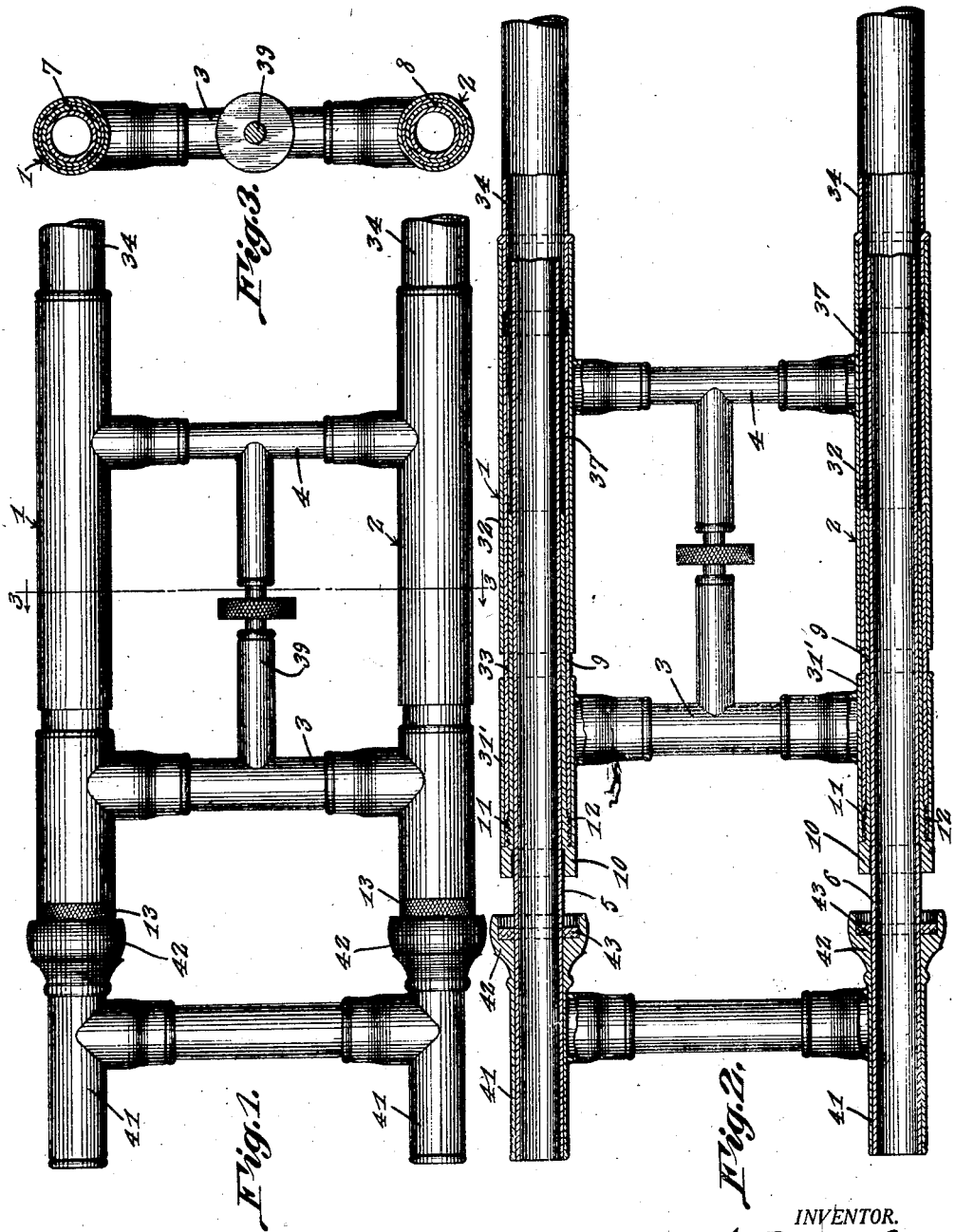

Patented Oct. 25, 1927.

1,647,079

UNITED STATES PATENT OFFICE.

FERDINAND A. BUESCHER, OF ELKHART, INDIANA.

SLIDE TROMBONE.

Application filed October 27, 1926. Serial No. 144,549.

This invention relates to slide trombones, more particularly to an improvement upon the slide trombone forming the subject matter of my application Serial No. 3,820, filed January 25, 1925, and a slide trombone construction, in accordance with this invention, not only embodies the objects and advantages, such as the balancing of the slide whereby a free movement and better action of the instrument is obtained and the substantial immunization of the slide from inoperativeness due to the denting of an outer tube is had, possessed by the slide trombone construction disclosed in the application aforesaid, but has for its further object to provide, in a manner as hereinafter set forth, a slide trombone including removable bearings for and carried by the slide for the expeditious substituting of new bearings to replace worn out bearings without the necessity of sending the instrument to the factory.

A further object of the invention is to provide, in a manner as hereinafter set forth, means associated with the slide bearings for lubricating the pistons during the reciprocation of the slide.

Further objects of the invention are to provide, in a manner as hereinafter set forth, a slide trombone embodying the objects and advantages aforesaid and which is simple in its construction and arrangement, strong, durable, thoroughly efficient in its use, conveniently assembled, and comparatively inexpensive to manufacture.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a fragmentary view, in side elevation, of a slide trombone in accordance with this invention.

Figure 2 is a fragmentary view, in longitudinal section, of the form of slide trombone shown in Figure 1.

Figure 3 is a section on line 3—3 Figure 1.

Figure 4 is a fragmentary view, in longitudinal section of a modified form of slide trombone in accordance with this invention.

Figure 5 is a section on line 5—5 Figure 4.

Figure 6 is a perspective view of a bearing employed in the form of slide trombone illustrated by Figure 4.

Figure 7 is a perspective view of the lubricating carrier employed in the form of slide trombone illustrated in Figure 4.

As is well known, a slide trombone includes a U-shaped tubular slide having the side tubes thereof sliding upon a pair of tubular pistons, and these latter forming in connection with the slide, an air pipe of variable length. The pistons enter the inner ends of the side tubes of the slide. The lower or outer ends of the side tubes are connected together by an end tube provided with a water valve. The end tube and water valve are not shown.

Referring to Figures 1, 2 and 3 of the drawings, the side tubes of the slide are indicated at 1 and 2 and which are connected adjacent their inner ends by the braces 3 and 4, as is well known in trombone slide constructions. The tubular pistons are indicated at 5 and 6 and telescope within the tubes 1 and 2.

As is well known, it is essential that a substantially fluid tight seal be maintained between the piston and tubes throughout the range of movement of the slide, and this is usually accomplished by enlarging the diameter of the pistons for a considerable distance adjacent their inner ends, and the surfaces of said enlarged portions coact with the inner walls of the tubes and constitute bearings, which by reason of their length effect the sealing of the joint between the piston and tubes. The pistons, with the exception of their bearing surfaces are of less diameter than the tubes in which they reciprocate, thereby providing a slight annular clearance space between them. The walls of the tubes 1 and 2 are made quite thin so as to contribute to the lightness of the slide and ease in operation. This renders the tubes easily dented, even when carefully handled. A dent in one of the tubes, no matter how slight, renders the trombone inoperative, for the bearing cannot pass the dented portion and the slide sticks. Or if the damage be so minute as to permit forcing of the bearing past the dented portion, the seal becomes broken and the tone of the instrument impaired.

The present invention removes entirely this draw-back, by omitting altogether the enlarged bearing surfaces or stockings at the ends of the pistons, leaving the pistons of uniform diameter throughout their entire lengths and maintaining between them and the tubes, within which they telescope, a uniform clearing space. Ordinary denting of the side tubes will therefore have no effect upon the action of the instrument since the displaced metal is accommodated within said clearing space. An extraordinary denting which may cause the metal of the tube to press against the pistons merely produces an added friction in the operation of the slide, but has no effect upon the seal between the piston and tubes, therefore the quality of the tone of the instrument remains unimpaired.

In lieu of the enlarged bearing surfaces at the ends of the pistons, the present invention provides similar surfaces in the form of constrictions in the internal diameter of the tubes 1 and 2, and said constrictions are provided by sleeves 7 and 8, which are inserted within the inner ends of the tubes 1 and 2, occupy the clearance space and bear against the outer surfaces of the pistons. The sleeves have a tight friction fit within the tubes, and further the tubes and sleeves to the tubes, whereby the sleeves are detachably secured in position and can be expeditiously removed to replace worn out bearings without the use of sending the instrument to the factory.

The sleeve 7, as well as the sleeve 8, consists of a body portion 9 having the inner diameter thereof uniform throughout and of a diameter to have the inner face of the sleeve provide a sliding fit with the periphery of a piston. The sleeve is so positioned relative to the tube that when the sleeve is in operative position, that is to say providing a bearing for the slide, the sleeve projects slightly from the inner end of the tube. The sleeve is formed on its outer face, at that end which projects from the inner end of the tube, with an annular head 10 which, when the sleeve is mounted in the tube, abuts against the inner end edge of the tube. The head acts as a stop to limit the extent in which the sleeve is positioned in the tube. The inner face of the tube, at the inner end thereof, is provided with threads, indicated at 11, and which are adapted to be engaged by threads 12 formed on the outer face of the sleeve in proximity to the head 10. The head 10 is knurled, as at 13, to facilitate the securing of the sleeve to the tube. When the sleeve is mounted in the tube, or rather when the sleeve is connected to the tube, the head is flush with the outer face of the tube.

The disposition of the sleeves to provide bearings at the ends of the tubes, not only minimize the chance of the instrument becoming inoperative through the denting of the slides, but it also improves the balance of the slide, placing the bearings directly above the point of support of the slide, so that given angular movement of the hands of the player with respect to the axis of the pistons, has less bearing effect upon the relatively reciprocating parts, than in cases where the bearings are remote from the point of support. Thus a free movement and a better action of the trombone is secured and the balance of the slide is improved by massing the metal above the point of support.

Generally trombones are lubricated prior to the playing of the instrument, by withdrawing the pistons and applying a few drops of lubricating oil to the stockings thereon. Heretofore it has been impossible to satisfactorily lubricate such an instrument while it is being played. A means whereby the pistons can be efficiently lubricated, while the instrument is being played, is disclosed in Figures 4 to 7 inclusive, and by reference thereto, the sleeves which provided the bearings are indicated at 14, 15, the side tubes of the slide at 16, 17, the pistons at 18, 19, and the braces at 20 and 21. The inner diameter of each of the sleeves 14, 15 is uniform throughout. Each sleeve comprises a body portion 22, a head formed of an outer part 23 and an inner part 24. The outer part 23 is of greater outer diameter than the inner part 24 thereby providing a shoulder 25. The outer diameter of the part 24 is greater than the outer diameter of the body portion 22. The periphery of the outer part 23 is knurled as at 26. The periphery of the inner part 24 is threaded throughout as at 27. The inner end of the inner part 24 provides a shoulder 28. The body portion 22 is provided throughout with spaced openings 29 for the passage of lubricant to a piston. The inner face of a tube 16 or 17, at the inner end thereof, is formed with threads 30 which engage with the threads 27 for detachably securing a sleeve to the tube. A lubricant carrier is indicated at 31 and which is of tubular form and constructed of fabric possessing an absorbent characteristic. The carrier 31 is impregnated with a lubricant, positioned upon the body portion 22 and confined between the outer face of the body portion 22 and the inner face of a tube 16 or 17. The carrier 31 is of the same length as the length of the body portion 22. The lubricant is fed from the carrier 31 through the openings 29 onto a piston. The carrier 31 possesses a compressible characteristic so that it will be tightly secured between a tube 16 or 17 and the outer face of the body portion 22. The inner face of the sleeve has a snug sliding fit with the outer face of a piston. The foregoing construction and arrangement of elements permits of the lubricating of the piston during the use of the instrument.

In both forms shown the inner end terminal portion of each side tube of the slide comprises a pair of outer tubular members 31′, 32, the latter being of greater length than the former. Arranged within the members 31′, 32 as well as being secured to the inner face of the member 31′ is a tubular member 33. The inner end of the member 33 is provided with threads which engage with the threads of a bearing sleeve.

In the form shown in Figure 1, each side tube of a slide includes a tubular member 34, which is fixedly secured to the inner face of the tubular member 32 and extends therefrom.

In the form shown in Figure 4 each side tube of the slide includes a tubular member 35, which has a band 36 secured to the periphery thereof, and said band 36 is fixedly secured to the inner face of the tubular member 32.

In the form shown in Figures 1 and 2, the clearance between the pistons and the inner faces of the side tubes of the slide is indicated at 37, and in Figure 4 the clearance between a piston and each side tube of the slide, is indicated at 38.

The braces 3 and 4 are adjustably connected together, as at 39. The brace 3 is fixedly secured to the tubular members 31′ and this statement applies to the brace 20. The brace 4 is fixedly secured to the tubular members 32 and this statement applies to the brace 21. The braces 20 and 21 are adjustably connected together as at 40. The adjustably connecting together of each pair of braces provides for lengthening the side tubes of a slide to vary the tune of the instrument. In both forms as shown, the casings 41 for the pistons are provided with stops 42 for limiting the inward movement of the slide. The stops 42 are constructed to overlap the heads of the sleeves when said heads abut against the stops. Cushioning means 43 are provided within the stops 42.

When the sleeves are mounted in the side tubes of the slide, or rather secured to said tubes, the heads thereof are flush with the outer face of the tubular members 31′.

In the form shown in Figure 4 the bearings are removable whereby new bearings can be furnished to replace worn out bearings without the use of sending the instrument to the factory. The bearings shown in Figure 4 are detachably secured in position in the same manner as the bearings shown in Figures 1 and 2. The difference between the construction shown in Figure 4 with respect to that shown in Figure 2, is that the form shown in Figure 4 is provided with the lubricant carrier and the sleeves are perforated for the passage of the lubricant to the pistons.

It is thought that the many advantages of a slide trombone, in accordance with this invention, can be readily understood, and although the preferred embodiment of the invention is as illustrated and described, yet it is to be understood that changes in the details of construction can be had which will fall within the scope of the invention as claimed.

What I claim is:

1. In a trombone, a slide comprising side tubes, pistons of the same cross sectional diameter throughout telescoping within said tubes, and sleeves positioned within the inner terminal portions of said tubes and constituting bearings between the pistons and the tubes, said sleeves and tubes having interengaging means for detachably securing the tubes and sleeves together.

2. In a trombone, a slide comprising side tubes, pistons of the same cross sectional diameter throughout telescoping within said tubes, and sleeves, each sleeve having a portion of its length extending into each tube at the inner end terminal portion thereof and constituting a bearing between a piston and a tube, said sleeves adjacent and in proximity to their outer ends provided with threads engaging in the inner faces of the tubes for detachably securing the sleeves and the tubes together.

3. A bearing for a trombone slide comprising a tubular member adapted to be removably fitted in each terminal portion of the slide and snugly embracing the piston telescoping within said slide.

4. A bearing for a trombone slide in accordance with claim 3, the providing of the outer end of said member with a head and its outer face, adjacent said head, with threads engaging in the inner face of the slide for detachably securing the member thereto.

5. In a slide trombone a bearing consisting of a tubular member adapted to be removably positioned in each terminal portion of the trombone slide and snugly embracing the piston telescoping in the slide, and a lubricating means for the piston interposed between said member and the inner face of a terminal portion of the slide, said means positioned adjacent one end of said member.

6. A slide trombone in accordance with claim 5, the providing of said member at its outer end with a head positioned exteriorly of a terminal portion in which said member is positioned and the further providing of said member on its periphery, adjacent said head, with threads for engagement in the inner face of the terminal portion in which the member is positioned to detachably secure said member to the slide.

7. In a slide trombone, a pair of removable slide bearings, each of said bearings of tubular form and adapted to be positioned for a portion of the length thereof in the inner end terminal portion of a side tube of the slide, each of said bearings having the inner diameter thereof to provide for a snug sliding fit therebetween and a piston telescoping in a side tube.

8. In a slide trombone in accordance with claim 7, the providing of the outer periphery of said bearings with means engaging in the inner faces of the tubes for detachably connecting the bearings to the tubes.

9. In a slide trombone in accordance with claim 7, means interposed between the bearings and the inner faces of the tubes for supplying lubricant to the pistons telescoping in the slides, said means having one end thereof arranged adjacent one end of the bearings.

10. In a trombone, a slide including side tubes, pistons of the same cross sectional diameter throughout telescoping within the slide, removable sleeves constituting bearings for the slide, said sleeves having a portion thereof extending within and removably secured to the inner terminal portions of said side tubes and further having the inner diameter thereof such to provide a sliding snug fit with the periphery of said pistons, said tubes and the portions of the sleeves extending therein interengaging with each other.

11. In a trombone, a slide including side tubes, pistons of the same cross sectional diameter throughout telescoping within the slide, removable sleeves constituting bearings for the slide, said sleeves having a portion thereof extending within and removably secured to the inner terminal portions of said side tubes and further having the inner diameter thereof such to provide a sliding snug fit with the periphery of said pistons, said tubes and the portions of the sleeves extending therein interengaging with each other, and means interposed between the tubes and the inwardly extending portions of the sleeves for lubricating the pistons.

12. In a trombone, a slide comprising tubes, pistons telescoping therein, sleeves constituting bearings for the pistons, said sleeves extending within and detachably secured within and to the inner terminal portions of said tubes and having the inner diameters thereof to provide for a snug sliding fit with the pistons, said sleeves permanently projecting from and abutting against the edge at the inner end terminal portions of said tubes.

13. In a trombone, a slide comprising tubes, pistons of the same cross sectional diameter throughout telescoping within the tubes and free of contact with these latter, sleeves extending into the inner terminal portions of said tubes and constituting bearings for the pistons, said sleeves having a portion of the length thereof interengaging with the inner faces of the tubes to detachably secure the sleeves and tubes together, and said sleeves having another portion of the length thereof arranged exteriorly of the tubes and of greater outer diameter than the portion thereof extending into the tubes.

14. In a trombone, a slide comprising tubes, pistons of the same cross sectional diameter throughout telescoping within the tubes and free of contact with these latter, sleeves extending into the inner terminal portions of said tubes and constituting bearings for the pistons, said sleeves having a portion of the length thereof interengaging with the inner faces of the tubes to detachably secure the sleeves and tubes together, said sleeves having another portion of the length thereof arranged exteriorly of the tubes and of greater outer diameter than the portion thereof extending into the tubes, and cushioning means carried by the pistons and adapted to be impacted by that part of the sleeve of greatest outer diameter.

15. A bearing for a trombone slide comprising a tubular member of uniform inner diameter, said member having parts of its length of different outer diameters thereby providing a peripheral shoulder, that part of said member of greatest outer diameter being of less length than that part of said member of smallest outer diameter.

16. A bearing for a trombone slide comprising a tubular member having the inner diameter thereof uniform and such to provide a snug sliding fit with a piston of the trombone, said member having parts of different outer diameters thereby providing a peripheral shoulder, that part of greatest outer diameter being of less length than the part of smallest outer diameter and the said part of smallest outer diameter provided with peripheral threads in proximity to the part of greatest outer diameter.

17. In a trombone, a slide comprising tubes, pistons of the same cross sectional diameter throughout telescoping within the tubes and free of contact with these latter, sleeves extending for a portion of their length into the inner terminal portions of said tubes and constituting bearings for the pistons, said sleeves having a portion of the length thereof interengaging with the inner faces of the tubes to detachably secure the sleeves and tubes together, said sleeves having another portion of the length thereof arranged exteriorly of the tubes and of greater thickness than the portion thereof extending into the tubes, and means within the tube and mounted on the sleeves for lubricating the pistons.

In testimony whereof, I affix my signature hereto.

FERDINAND A. BUESCHER.